United States Patent [19]
Endo et al.

[11] Patent Number: 4,812,484
[45] Date of Patent: Mar. 14, 1989

[54] PROCESS FOR PRODUCING EXPANDED PARTICLES OF STYRENE-ACRYLONITRILE-BUTADIENE COPOLYMER

[75] Inventors: Hiroshi Endo; Toshihiro Gotoh, both of Mie, Japan

[73] Assignee: Mitsubishi Yuka Badische Co., Ltd., Yokkaichi, Japan

[21] Appl. No.: 86,580

[22] Filed: Aug. 18, 1987

[30] Foreign Application Priority Data

Sep. 19, 1986 [JP] Japan ................. 61-221610

[51] Int. Cl.$^4$ .............. C08J 9/18; C08J 9/22
[52] U.S. Cl. ........................ 521/60; 521/56; 521/58; 521/59; 521/139; 521/140
[58] Field of Search .......... 521/56, 58, 60, 59

[56] References Cited

U.S. PATENT DOCUMENTS

| | | | |
|---|---|---|---|
| 4,524,154 | 6/1985 | Maeda et al. | 521/58 |
| 4,525,485 | 6/1985 | Maeda et al. | 521/58 |
| 4,602,047 | 7/1986 | Endo | 521/58 |
| 4,689,351 | 8/1987 | Endo | 521/58 |

Primary Examiner—Morton Foelak
Attorney, Agent, or Firm—Oblon, Fisher, Spivak, McClelland & Maier

[57] ABSTRACT

A process for producing expanded particles of a styrene-acrylonitrile-butadiene copolymer is disclosed, comprising dispersing styrene-acrylonitride-butadiene copolymer particles in water in a closed vessel, feeding a volatile blowing agent to the aqueous dispersion in the closed vessel, heating the aqueous dispersion to a temperature higher than a glass transition point of the copolymer particles by at least 20° C. to impregnate the volatile blowing agent into the copolymer particles, and opening one end of the closed vessel to release the aqueous dispersion containing the expandable copolymer particles into a low pressure zone having a pressure lower than the inner pressure of the closed vessel. The resulting expanded particles have a degree of expansion of from 10 to 50.

7 Claims, No Drawings

PROCESS FOR PRODUCING EXPANDED PARTICLES OF STYRENE-ACRYLONITRILE-BUTADIENE COPOLYMER

FIELD OF THE INVENTION

This invention relates to a process for producing expanded particles of styrene-acrylonitrile-butadiene copolymer which are useful as cushionings for bumper of automobiles and molding materials for various containers.

BACKGROUND OF THE INVENTION

Molded articles made of expanded polystyrene foamed articles are widely employed, especially as heat insulating materials, packaging materials or cushioning materials, but have a disadvantage of low heat resistance, e.g., about 70° to 80° C. at the highest.

The problem of low heat resistance can be solved by using polypropylene foamed articles or styrene-acrylonitrile-butadiene copolymer (ABS resin) foamed articles.

Expanded polypropylene particles can be prepared by a process comprising dispersing polypropylene particles in water in a closed vessel, feeding a blowing agent to the vessel, heating the dispersion to a temperature of from the softening point of the polypropylene particles up to a temperature higher than the melting point of the polypropylene particles by 20° C. while keeping the inner pressure at the vapor pressure of the blowing agent or higher, and opening an outlet provided below a liquid level of the closed vessel to thereby release an aqueous dispersion containing polypropylene particles impregnated with the blowing agent into an atmosphere having a pressure lower than the inner pressure of the closed vessel. For details, reference can be made to it, e.g., in Japanese Laid-Open Patent Application Nos. 12035/82, 25336/82, 90027/82, 195131/82, 1732/83, 23834/83, 25334/83, 33435/83, 55231/83, 76229/83, 76231/83 to 76234/83 and 87027/83. According to this process, expanded polypropylene particles having a bulk density of from 0.026 to 0.06 g/cm$^3$ can be obtained. It is known that the above process is also applicable to production of polyethylene particles or cross-linked polyethylene particles as described in the above-cited publications.

The expanded polypropylene particles can be molded into a core of bumper or a container by incorporating air or nitrogen gas in the particles to impart secondary expandability, charging the expandable particles in a cavity of mold having steam vents, and heating the particles with steam of from 1.5 to 6 kg/cm$^2$G in pressure to expand and fuse with each other, followed by cooling. The molded articles of expanded polypropylene particles can also be obtained by compressing the expanded polypropylene particles with pressurized nitrogen gas or air, charging the compressed particles into a cavity of mold, and heating the particles to fuse with each other, followed by cooling.

The above-mentioned process for producing highly expanded polypropylene particles cannot be applied to production of expanded ABS resin particles because a non-crystalline ABS resin having high heat resistance and high bending strength behaves differently from crystalline polypropylene.

In the production of expanded polypropylene particles, the temperature for heating the aqueous dispersion of polypropylene particles is usually controlled between a range of from a temperature lower than the melting point of polypropylene by 10° C. to a temperature higher than the melting point of polypropylene by 5° C. in order to prevent fusion among polypropylene particles. It is considered in the art that impregnation of a volatile blowing agent into the resin particles is effected at non-crystalline portions or voids formed by shrinkage accompanying crystallization but not at crystalline portions. It appears that the polypropylene particles in the aqueous dispersion are plasticized by the presence of the volatile blowing agent to have a decreased apparent melting point.

Therefore, it is anticipated that a volatile blowing agent must be sufficiently impregnated into the non-crystalline ABS resin particles at around a glass transition point (Tg) that corresponds to a melting point of crystalline resins. Nevertheless, the volatile blowing agent can hardly be impregnated into center of the ABS resin particles in an aqueous dispersion system for some unknown reasons, failing to obtain expanded particles.

SUMMARY OF THE INVENTION

Accordingly, one object of this invention is to provide a process for producing expanded styrene-acrylonitrile-butadiene copolymer (ABS resin) beads or particles having a high degree of expansion.

The expanded ABS resin particles obtained by the process of the present invention have a degree (ratio) of expansion of from 10 to 50. The process of the present invention is epoch-making seeing that the expanded ABS resin particles having a degree of expansion of 5 at the most are conventionally obtained by injection expansion molding or extrusion expansion molding.

The present invention relates to a process for producing expanded particles of a styrene-acrylonitrile-butadiene copolymer which comprises dispersing styrene-acrylonitrile-butadiene copolymer particles in water in a closed vessel, feeding a volatile blowing agent to the aqueous dispersion in the closed vessel, heating the aqueous dispersion to a temperature higher than a glass transition point (Tg) of the copolymer particles by at least 20° C. to impregnate the volatile blowing agent into the copolymer particles, and opening one end of the closed vessel to release the aqueous dispersion containing the expandable copolymer particles into a low pressure zone having a pressure lower than the inner pressure of the closed vessel.

DETAILED DESCRIPTION OF THE INVENTION

The styrene-acrylonitrile-butadiene copolymer particles which can be used in the present invention include those obtained by blending a binary styrene-acrylonitrile copolymer (usually called AS resin or SAN) and a butadiene-acrylonitrile rubber and those obtained by dissolving polybutadiene in a mixed monomer of styrene and acrylonitrile to effect suspension polymerization.

These styrene-acrylonitrile-butadiene copolymer resins may be used either individually or in combination among themselves or in combination with other polymers, e.g., polystyrene, high-impact polystyrene, a styrene-methyl methacrylate copolymer, an α-methylstyrene-styrene-acrylonitrile copolymer, a nitrile rubber, a styrene-butadiene rubber, etc.

The resin particles may contain additives, such as inorganic fillers (e.g., talc, clay, calcium carbonate, titanium oxide, zeolite, etc.), antioxidants, antistatic agents, ultraviolet ray absorbents, carbon black, lubricants (e.g., aluminum stearate, zinc stearate, aluminum p-tertiary-butylbenzoate, etc.), flame-retardants (e.g., 2,3-dimethyl-2,3-diphenylbutane, tris(dibromopropyl)-phosphate, pentabromodiphenyl ether, tetrabromobutane, dibromoethylbenzole, 1,2,5,6,9,10-hexabromocyclodecane, etc.), plasticizers, and the like in a total amount of from 0.05 to 5% by weight based on the resinous components.

The expanded resin particles have a particle size of from 2 to 8 mm, and a bulk density of from 10 to 100 g/liter, and preferably from 10 to 70 g/liter. They may have a form of either beads or particles.

Although highly expanded particles cannot be obtained from polystyrene or SAN particles, such can be obtained from ABS resin particles if ample time is devoted to impregnation of a blowing agent presumably because the ABS resin particles contain a rubber component, e.g., a butadiene-acrylonitrile rubber, polybutadiene, etc.

The volatile blowing agent which can be used in the present invention includes organic compounds have a boiling point of 80° C. or less, such as aliphatic hydrocarbons, e.g., propane, butane, pentane, hexane, heptane, etc., and halogenated hydrocarbons, e.g., trichlorofluoromethane, dichlorodifluoromethane, dichlorotetrafluoroethane, methyl chloride, ethyl chloride, methylene chloride, etc., either individually or in combinations of two or more thereof.

The amount of the blowing agent to be fed varies depending on the kind of the blowing agent and the desired degree of expansion, and usually ranges from 10 to 50 parts by weight per 100 parts by weight of the resin particles.

A dispersing agent to be used as an aid for dispersing the resin particles in water includes inorganic suspending agent, e.g., aluminum oxide, titanium oxide, calcium carbonate, basic magnesium carbonate, calcium tertiary phosphate, etc.; water-soluble high polymeric protective colloids, e.g., polyvinyl alcohol, methylcarboxy cellulose, N-polyvinylpyrrolidone, etc.; and anionic surface active agents, e.g., sodium dodecylbenzenesulfonate, sodium alkanesulfonates, sodium alkylsulfates, sodium olefin sulfates, acylmethyltaurines, sodium dialkylsulfosuccinates, etc. Of these, a combination of calcium tertiary phosphate having a particle size of from 0.01 to 0.8 μm and, as a suspension aid, sodium dodecylbenzenesulfonate is preferred. Such fine calcium tertiary phosphate can be obtained by reacting 1 mol of calcium hydroxide with 0.60 to 0.67 mol of phosphoric acid in water.

The amount of water to be used as a dispersing medium ranges from 150 to 1,000 parts by weight, and preferably from 200 to 500 parts by weight, per 100 parts by weight of ABS resin particles. If it is less than 150 parts by weight, blocking among the resin particles readily takes place during heating and pressing. If it exceeds 1,000 parts by weight, productivity of the expanded ABS resin particles would be uneconomically reduced.

To the aqueous dispersion of ABS resin particles is then fed a gaseous or liquid blowing agent. The aqueous dispersion is then heated to a temperature higher than the glass transition point (Tg) of the ABS resin particles at least by 20° C., and preferably a temperature within a range of from (Tg+25° C.) to (Tg+55° C.). By the heating, the pressure within the vessel elevates to impregnate the blowing agent into the ABS resin particles.

In order to assure complete impregnation of the volatile blowing agent into the ABS resin particles, it is desirable that the aqueous dispersion heated to a temperature higher than Tg by at least 20° C. be retained at that temperature for a period of from 0.5 to 5 hours. The retention time varies depending on the particle size of the starting ABS resin and the heating temperature. In cases where it is intended to impregnate the volatile blowing agent midway between the surface and the center of the resin particles to thereby obtain resin particles whose shell portion is expanded with their core (center) portion remaining non-expanded, the retention time can be selected from the range of from 5 minutes to 2 hours. Since the particle size and weight of the starting resin are not standardized, it is most likely that the expanded resin particles obtained by heating for a period of from 1 to 2 hours comprise those particles which are wholly expanded and those particles which are expanded only in their shell (surface) portion.

Either before or after the addition of a blowing agent to the closed vessel, an inorganic gas, e.g., nitrogen, helium, argon, air, etc., is preferably introduced into the closed vessel to elevate the inner pressure as taught in Japanese Laid-Open Patent Application No. 55231/83 and Japanese Patent Application No. 156056/83 (corresponding to Japanese Laid-Open Patent Application No. 49039/85). The introduction of the inorganic gas may be effected either before or after the heating of the aqueous dispersion. The introduction of the inorganic gas into the closed vessel facilitates impregnation of the blowing agent into the resin particles and the subsequent release of the dispersion into a lower pressure zone (open air) to obtain expanded resin particles having a fine cellular structure.

The glass transition point (Tg) of the resin can be determined as follows. A resin sample is heated up to 200° C. at a rate of 10° C./min by means of a differential scanning calorimeter (DSC), and the point of inflection accompanying glass transition is first-order differentiated. The temperature of the resulting peak is taken as Tg.

During the heating, the aqueous dispersion in the closed vessel is stirred in order to prevent blocking of the softened resin particles. After the heating, the resin particles are released together with water from an outlet (e.g., a slit, a nozzle, etc.) provided at the lower portion of the closed vessel into a lower pressure zone, usually having atmospheric pressure to thereby obtain expanded resin particles having a bulk density of from 10 to 100 g/liter.

The thus obtained expanded ABS resin particles are dried at room temperature for one day to remove water. The molding of the resulting expanded ABS resin particles can be carried out by, for example, charging them into a cavity of mold and heating them with a heating medium, such as steam, at a temperature of from 105° to 130° C. for a period of from about 5 seconds to about 1 minute.

The resulting foamed molded articles of ABS resin show excellent fusion among expanded particles and high mechanical strength. The expanded particles and the foamed molded articles have a ratio of closed cells as high as 80% or more, with fine cells having a diameter of from 20 to 200 μm.

The present invention will now be illustrated in greater detail by way of the following examples, but it should be understood that the present invention is not limited thereto. In these examples, all the parts and percents are given by weight unless otherwise indicated.

EXAMPLE 1

In an autoclave were charged 100 parts of ABS particles having a particle size of from 2 to 3 mm ("ABS-10"; trade name produced by Japan Synthetic Rubber Co., Ltd.; Tg: 104.7° C.), 250 parts of water, 1.0 part of calcium tertiary phosphate having a particle size of from 0.3 to 0.5 μm, and 0.007 part of sodium dodecylbenzenesulfonate (packing: 62 vol%). Nitrogen gas was introduced into the autoclave while stirring until the inner pressure reached 5 kg/cm²G. After stopping the nitrogen feed, 18 parts of butane was fed in the closed vessel. The mixture was heated up to 140° C. over a period of 1 hour and kept at that temperature for 1 hour. The inner pressure of the autoclave was 28 kg/cm²G.

A valve of a discharge nozzle at the bottom of the autoclave was opened to release the dispersion into open air within about 2 seconds to effect expansion. The inner pressure of the autoclave at the time when the release of the dispersion completed was about 9 kg/cm²G. During the release, the inner temperature of the autoclave was maintained at 140° C.

The resulting expanded ABS resin particles had a bulk density of about 37 g/liter and a particle size of about 6 mm. The particles had expanded throughout the shell and the core with foamed cells of from 20 to 100 μm in diameter. The expanded particles were free of any blocking.

After the expanded particles were allowed to stand at 40° C. for 1 day to remove water, they were charged into a cavity of mold having steam vents. Steam of 0.7 kg/cm²G was introduced therein through the vents to fuse the expanded particles to each other. The molded article was cooled with water for 30 minutes and then allowed to cool for 60 seconds, and removed from the mold to obtain foamed molded article made of the expanded ABS resin particles, having a density of about 37 g/liter, a length of 300 mm, a width of 100 mm, and a thickness of 50 mm.

The resulting foamed molded article was evaluated for appearance, compressive strength, and heat resistance according to the following test methods. The results obtained are shown in Table 1.

(1) Appearance:
Excellent: Smooth surface with satisfactory gloss.
Good: Smooth surface with gloss.
Poor: Smooth surface with slightly poor gloss.
Very poor: Rough surface.

(2) Compressive Strength:
Measured on a specimen measuring 50 mm+50 mm×25 mm according to JIS K6767. Calculated from a stress at 50% compression.

(3) Heat Resistance:
A specimen measuring 80 mm×80 mm×50 mm was heated at 80° C. for 24 hours. After allowing to cool at 20° C. for 24 hours, a percentage of dimensional shrinkage by heating was calculated through equation:

$$\text{Percentage of Shrinkage}(\%) = \frac{[(\text{Dimension before Heating}) - (\text{Dimension after Heating})]}{(\text{Dimension before Heating})} \times 100$$

EXAMPLE 2 AND COMPARATIVE EXAMPLES 1 AND 2

Expanded resin particles and foamed molded articles were prepared in the same manner as in Example 1, except for replacing ABS-10 with "ABS-35" (trade name: "JSR-ABS"; ABS particles produced by Japan Synthetic Rubber Co., Ltd.; Tg: 99.4° C.) (Example 2), "SAN-A" (trade name: "Sanlex"; SAN particles produced by Mitsubishi Monsant Chemical Co., Ltd.; Tg: 103.3° C.) (Comparative Example 1) or "LB-B" (trade name: "Denka Styrol"; polystyrene beads produced by Electrochemical Industry Co., Ltd.; Tg: 103.3° C.) (Comparative Example 2) and changing the heating temperature in Example 2 to 135° C. The physical properties of the resulting expanded particles and foamed molded particles are shown in Table 1.

TABLE 1

|  | Example 1 | Example 2 | Comparative Example 1 | Comparative Example 2 |
|---|---|---|---|---|
| Resin (Tg: °C.) | ABS (104.7) | ABS (99.4) | SAN (103.3) | Polystyrene (103.3) |
| Heating: |  |  |  |  |
| Temperature (°C.) | 140 | 135 | 140 | 140 |
| Time (hour) | 1 | 1 | 1 | 1 |
| Expanded Particles: |  |  |  |  |
| Bulk Density (g/l) | 37.2 | 33.0 | Not expanded | 155.5* |
| Particle Size (mm) | ca. 6 | ca. 6 | — | — |
| Cell Diameter (μm) | 100–200 | 80–170 | — | — |
| Foamed Molded Article: |  |  |  |  |
| Appearance | Excellent | Excellent |  |  |
| Compressive Strength (kg/cm²) | 3.1 | 2.7 |  |  |
| Heat Resistance (%) | Less than 1.0 | 1.5 |  |  |

Note:
*Serious shrinkage was observed.

EXAMPLE 3

Expanded ABS resin particles were prepared in the same manner as in Example 1, except for changing the retention time of heating at 140° C. to 15, 30 or 45 minutes.

The bulk density of the resulting expanded particles was measured, and the state of expansion was observed on a cross section of the expanded particle. The results obtained are shown in Table 2 below.

TABLE 2

| Heating Time (min) | Bulk Density (g/l) | State of Expansion | |
|---|---|---|---|
| | | Shell Portion | Core Portion |
| 15 | 61.2 | Expanded | Not expanded |
| 30 | 36.9 | Expanded | Not expanded |
| 45 | 35.0 | Expanded | Expanded |

EXAMPLES 4 AND 5 AND COMPARATIVE EXAMPLES 3 AND 5

Expanded ABS resin particles were prepared in the same manner as in Example 1, except for changing the heating temperature as shown in Table 3.

The physical properties of the resulting expanded particles are shown in Table 3.

TABLE 3

| Example No. | Heating Temperature (°C.) | Bulk Density (g/l) | State of Expansion | | Blocking |
|---|---|---|---|---|---|
| | | | Shell Portion | Core Portion | |
| Comparative Example 3 | 95 | | Not expanded | Not expanded | None |
| Comparative Example 4 | 110 | | Not expanded | Not expanded | None |
| Comparative Example 5 | 115 | | Not expanded | Not expanded | None |
| Example 4 | 130 | 77.6 | Expanded | Not expanded | None |
| Example 5 | 150 | 27.4 | Expanded | Expanded | Observed |

While the invention has been described in detail and with reference to specific embodiments thereof, it will be apparent to one skilled in the art that various changes and modifications can be made therein without departing from the spirit and scope thereof.

What is claimed is:

1. A process for producing expanded particles of a styrene-acrylonitrile-butadiene copolymer which comprises dispersing styrene-acrylonitrile-butadiene copolymer particles in water in a closed vessel, feeding a volatile blowing agent to the aqueous dispersion in the closed vessel, heating the aqueous dispersion to a temperature higher than the glass transition point of the copolymer particles by at least 20° C. wherein the heated aqueous dispersion is maintained at the heated temperature for a period of from 5 minutes to 5 hours to impregnate said volatile blowing agent into the copolymer particles, and opening one end of the closed vessel to release the aqueous dispersion containing the expandable copolymer particles into a low pressure zone having a pressure lower than the inner pressure of the closed vessel, wherein said expanded particles have a bulk density of from 10 to 70 g/liter.

2. A process as in claim 1, wherein said releasing of the aqueous dispersion is effected under a pressure of an inorganic gas into an atmospheric pressure zone.

3. A process as in claim 1, wherein said blowing agent is butane.

4. A process as in claim 1, wherein said heating of the dispersion is at a temperature between a temperature higher than the glass transition point of the copolymer particles by 25° C. and a temperature higher than the glass transition point of the copolymer particles by 55° C.

5. A process as in claim 1, wherein the heated aqueous dispersion is maintained at the heating temperature for a period of from 0.5 to 5 hours.

6. A process as in claim 1, wherein the expanded particles have a ratio of closed cell of 80% or more.

7. A process as in claim 1, wherein the expanded particles have a cell diameter of from 20 to 200 μm.

* * * * *